Nov. 18, 1952     F. J. SEIFERT     2,618,167

TRACTOR LIFT CONTROL

Filed March 25, 1949

INVENTOR.
FRANK J. SEIFERT,
BY
McMorrow, Berman + Davidson
ATTORNEYS.

Patented Nov. 18, 1952

2,618,167

UNITED STATES PATENT OFFICE 2,618,167

TRACTOR LIFT CONTROL

Frank J. Seifert, Williams, Mont.

Application March 25, 1949, Serial No. 83,405

3 Claims. (Cl. 74—469)

This invention relates to implement lift mechanism provided on farm tractors and similar machines, and more particularly to a lift mechanism control for maintaining the drawbar of a tractor, such as a Ford-Ferguson tractor, at a constant, predetermined height.

It is among the objects of the invention to provide control means for the hydraulic lift mechanism of a farm tractor having an automatic, implement-actuated lift control, whereby the tractor drawbar can be constantly maintained substantially at a selected height when the implement-actuated control is disconnected and inoperative, which control means is manually adjustable for selecting a desired drawbar height, does not interfere, in any way, with the normal operation of the tractor or its implement-lift mechanism, is simple and durable in construction, economical to manufacture, and can be applied to an existing tractor without material modification of the tractor structure.

Other objects and advantages will become apparent from a consideration of the following description and the appended claims in conjunction with the accompanying drawing, wherein:

Figure 1:
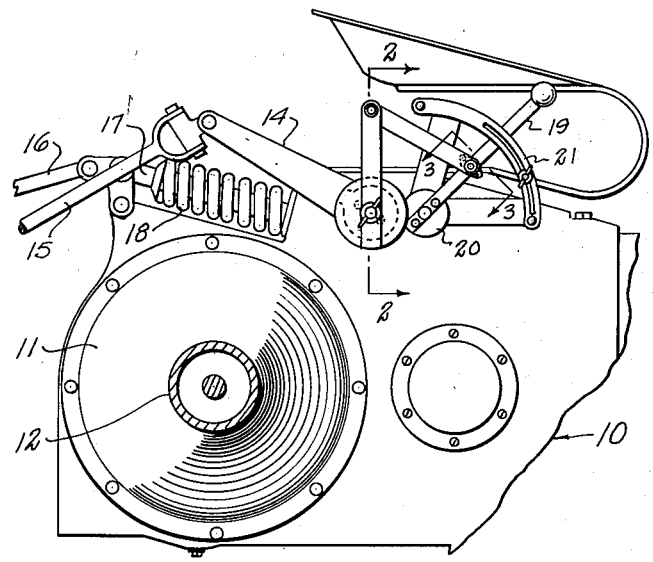
Figure 1 is a side elevation of a fragmentary portion of a farm tractor showing the external portions of the tractor-carried implement-lift mechanism and a lift-control means illustrative of the invention operatively applied to the implement-lift mechanism.
Figures 2, 3, 4:
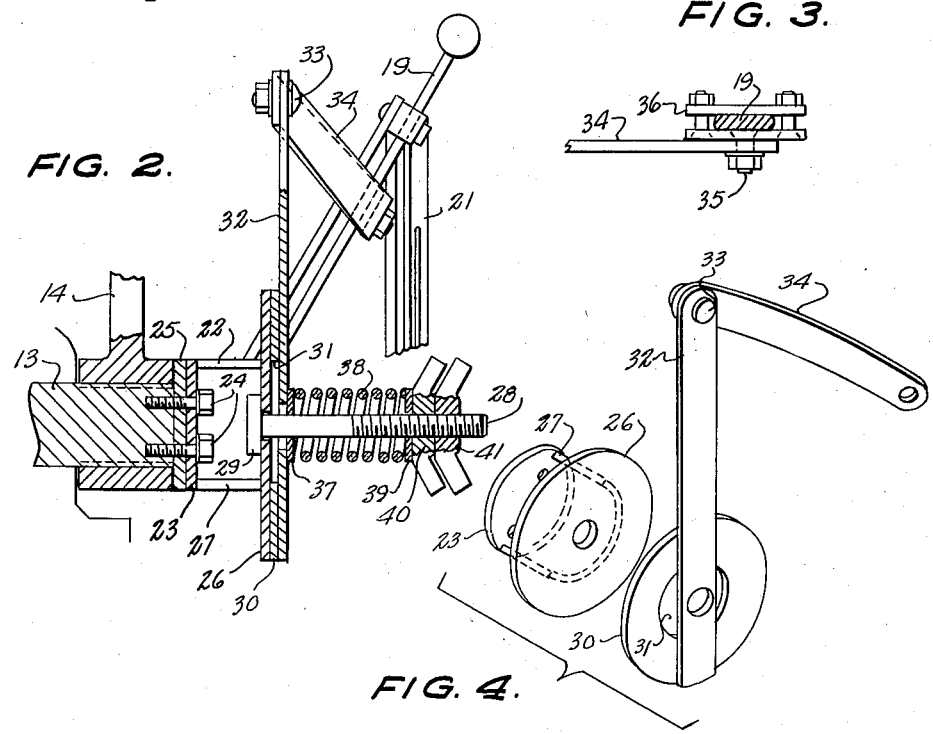
Figure 2 is a cross-section on an enlarged scale taken substantially on the line 2—2 of Figure 1.
Figure 3 is a cross-section on the line 3—3 of Figure 1.
Figure 4 is a perspective, exploded view of the control means of the invention.

With continued reference to the drawing, the numeral 10 generally indicates the rear portion of a farm tractor including the tractor differential housing 11 and rear axle 12. A rock shaft 13 is transversely journaled in the upper part of the rear portion of the tractor and is operated by hydraulic mechanism contained within the tractor and not illustrated. The hydraulic mechanism is supplied with hydraulic fluid from a suitable hydraulic pump, also contained within the tractor, under the control of a suitable valve which operates to supply hydraulic fluid from the pump to the hydraulic rock-shaft rotating mechanism or to connect the hydraulic mechanism with a drain or sump. When the hydraulic mechanism is supplied with hydraulic fluid under pressure, it will rotate the rock shaft 13 in a direction to raise the tractor drawbar, not illustrated, and when the hydraulic mechanism is connected with a drain and sump, it will allow the rock shaft 13 to rotate in a direction to lower the drawbar. Lift arms 14 extend radially outwardly from the rock shaft 13 at respectively opposite ends of the rock shaft, and the outer or distal ends of these lift arms 14 are connected by respective links 15 to the tractor drawbar. In the Ford-Ferguson tractor and implement lift system, a compression link 16 is connected to the implement and operates valve-controlling mechanism including the stem 17 against the force of a compression spring 18 to maintain the implement at a substantially constant depth, which depth is pre-selected by operation of the hand lever 19. When the hand lever 19 is moved in one direction, the hydraulic valve is biased to maintain the tractor drawbar at a relatively lower position, and when the hand lever is moved in the opposite direction, the valve is biased to maintain the drawbar in a relatively higher position.

The hand lever is held in adjusted position by suitable means, such as a friction coupling 20, interposed between the pivoted end of the lever and the adjacent portion of the tractor.

As long as the mechanism including the compression link 16 and stem 17 is operatively connected to an implement towed by the tractor, the tractor tow bar will be maintained, substantially constantly, at a selected height above the ground corresponding to the position of the hand lever 19 along the lever quadrant 21. However, when the compression link 16 is disconnected and the valve-controlling mechanism operated thereby is inoperative, there is nothing to control the hydraulic valve, and the drawbar may drop because of leakage of hydraulic fluid from the hydraulic mechanism, or may tend to rise, if there is a leakage of fluid under pressure, into the hydraulic mechanism from the hydraulic pump.

As the construction of the tractor and the hydraulic implement lift mechanism and its operative functions are well known, it has not been considered necessary to illustrate the entire mechanism and explain the same, in detail.

From the above brief description, it follows that when the tractor is used to tow an implement, such as a mowing machine, a rake, or a wagon, and the compression link 16 is not in use, it is not possible, with the conventional mechanism, to maintain the tractor drawbar at any predetermined height above the ground, the drawbar rising or falling as a consequence of the leakage of hydraulic fluid from, or into the hydraulic mechanism which rotates the lift rock shaft 13.

In order to overcome this difficulty, the control mechanism of the invention has been provided, and comprises a hollow bracket 22 secured to that end of the rock shaft 13 adjacent which the hand lever 19 is positioned. This bracket includes a circular plate 23 having two spaced-apart apertures therethrough which receive the stud bolts 24 by means of which the end plate 25 is secured to the end of the rock shaft, a circular clutch plate 26 larger than, and concentric with the plate 23, and legs 27 holding the clutch plate in spaced, parallel relationship to the attachment plate 23. The clutch plate 26 is provided with a central aperture through which extends a bolt 28 having a head 29 disposed at the side of the clutch plate adjacent the attachment plate 23, and a second circular clutch plate 30 is disposed against the outer face of the clutch plate 26 substantially concentric with the latter, and provided with an enlarged, central aperture 31 which surrounds the bolt 28. An elongated lever arm 32 is secured to the outer face of the clutch plate 30, and extends substantially diametrically of this clutch plate and radially beyond the clutch plate at one end. This lever is apertured near its distal end to receive a pivot bolt 33 which pivotally connects to the lever arm one end of a link 34. The opposite end of the link 34 is pivotally connected by a pivot bolt 35 extending through an aperture near the corresponding end of the link, to a clamp 36 which surrounds the hand lever 19 intermediate the length of the latter.

A washer 37 surrounds the bolt 28 and is disposed against the outer side of the lever arm 32, and a coiled compression spring 38 surrounds the shaft between the washer 37 and a second washer 39 which surrounds the bolt 28 near the outer end of the latter. The bolt 28 is externally screw threaded near its end opposite the head 29, and a nut 40 is threaded onto the screw-threaded portion of the bolt and bears against the washer 39. Preferably a lock nut 41 is also threaded onto the bolt and bears against the nut 40. Both of the nuts 40 and 41 may be provided as wing nuts to facilitate threading them along the bolt.

With the control means of the invention installed, as described above, the hand lever 19 may be moved to a position coresponding to a desired height of the tractor drawbar, the friction connection between the clutch plates 26 and 30 permitting the lever arm 32 to move relative to the rock shaft 13 and follow the movements of the hand lever. The hand lever is then held at the desired position until the hydraulic mechanism has rotated the rock shaft and brought the tractor drawbar to the corresponding height. The hand lever may then be released and, if the drawbar tends to rise or fall, the hand lever will be correspondingly moved to apply additional hydraulic fluid to the hydraulic mechanism, or drain fluid therefrom to maintain the drawbar substantially at the selected height.

When it is desired to return the lift mechanism to operation by the compression link 16, the nuts 40 and 41 are threaded outwardly on the bolt 28 to release the friction drive between the plates 26 and 30, whereupon the implement-lift mechanism will operate in the usual manner.

As the rack shaft is already drilled and tapped for the bolts 24, and the bolts are already present in the conventional construction, and as the clamp 36 connects the link 34 to the hand lever 19 without requiring any holes in the hand lever, the control means can be applied to the tractor lift structure without any modification whatever of the existing structure, and it will not interfere, in any way, with normal operation of the implement-lift mechanism.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Control means for a tractor-lift mechanism having a rock shaft and a manually-operated control lever comprising a friction clutch secured to one end of said rock shaft, an arm extending radially of the rock shaft and drivenly connected to the latter by said friction clutch, and a pivoted link connecting the distal end of said arm to said control lever.

2. In a tractor-carried implement-lift mechanism including a valve-controlling link, a rock shaft, and a manually-operated valve-control lever, means for imparting a valve-controlling function to the manually-operated lever when the valve-controlling link is inoperative comprising a friction clutch mounted on one end of the rock shaft, a lever arm carried and driven by said clutch, and a link connecting said lever arm at its distal end to said manually-operated lever intermediate the length of the latter.

3. In a tractor carred implement lift mechanism including a valve controlling link, a rock shaft, and a manually operated valve controlling lever, means for imparting a valve controlling function to the manually operated lever when the valve controlling link is inoperative comprising a friction clutch mounted on one end of the rock shaft, a lever arm carried and driven by said clutch, and a link connecting said lever arm at its distal end to said manually operated lever intermediate the length of the latter, said friction clutch comprising a mounting plate secured to said one end of said rock shaft, a first clutch plate spaced from and substantially parallel to said mounting plate and having an aperture therein substantially concentric with the axis of said rock shaft, legs extending between said mounting plate and said first clutch plate supporting the former from the latter, a second clutch plate secured to said arm and disposed against the side of said first clutch plate remote from said mounting plate, said second clutch plate having an aperture therein registering with the aperture in said first clutch plate, a bolt extending through the apertures in said clutch plates, a nut on one end of said bolt, a spring interposed between said nut and the adjacent clutch plate resiliently forcing said clutch plates together, and a facing of friction material carried by one of said clutch plates and engaging the opposed face of the other clutch plate.

FRANK J. SEIFERT.

REFERENCES CITED

The following references are of record in the file of this patent:

UNITED STATES PATENTS

| Number | Name | Date |
|---|---|---|
| 986,311 | Pollock | Mar. 7, 1911 |
| 2,118,180 | Ferguson | May 24, 1938 |
| 2,156,047 | Arnold et al. | Apr. 25, 1939 |
| 2,220,180 | Spitzglass et al. | Nov. 5, 1940 |
| 2,240,879 | Arnst | May 6, 1941 |
| 2,540,429 | Cordes | Feb. 6, 1951 |